Feb. 28, 1961 — E. H. HANDLER — 2,973,169
TILT FLOAT HELICOPTER
Filed Aug. 7, 1958 — 3 Sheets-Sheet 1

INVENTOR
EUGENE H. HANDLER
BY R. S. Tompkins
ATTORNEY

INVENTOR
EUGENE H. HANDLER

BY *R. J. Tompkins*

ATTORNEY

Feb. 28, 1961 E. H. HANDLER 2,973,169
TILT FLOAT HELICOPTER
Filed Aug. 7, 1958 3 Sheets-Sheet 3

INVENTOR
EUGENE H. HANDLER

BY R. J. Tompkins
ATTORNEY

United States Patent Office 2,973,169
Patented Feb. 28, 1961

2,973,169

TILT FLOAT HELICOPTER

Eugene H. Handler, Kensington, Md., assignor to the United States of America as represented by the Secretary of the Navy Filed Aug. 7, 1958, Ser. No. 753,851

4 Claims. (Cl. 244—105)

(Granted under Title 35, U.S. Code (1952), sec. 266)

The invention described herein may be manufactured and used by or for the Government of the United States of America for governmental purposes without the payment of any royalties thereon or therefor.

The present invention relates to improvements in the landing equipment for aircraft of the helicopter or vertical lift and descent heavier-than-air type or multi-float seaplanes which will greatly facilitate the machine alighting upon water and providing float means which will enable said craft to float upon water with relatively small vertical motion due to wave action. More particularly, the invention utilizes pontoons or floats which are adapted to be pivoted to a vertical position when the aircraft is at rest on water. By the use of vertical pontoons, the vertical motion of the craft due to wave action of the water is significantly reduced and thereby permits the landing and operation of an aircraft in rough seas not attainable heretofore.

At the present time, there are numerous requirements for a helicopter operating upon the open sea. For example, it is now commonplace for helicopters to be used for sonar dunking, air-sea rescue, etc. These uses require that the helicopter hover over a particular area for various periods of time. Unfortunately the fuel consumption during hovering is extremely high so that the radius of action is adversely affected to a substantial degree should prolonged hovering become necessary during a mission. Consequently, it would be obviously advantageous to allow the aircraft to alight upon the water, perform its task and later ascend. Heretofore, the conventional hull or float configuration of such a craft has had unsatisfactory sea-keeping qualities and may therefore be operated only with restricted limitations. That is, waves of three to five feet in height and winds of seven to ten knots were the maximum conditions under which an aircraft of that type could safely be sustained in the sea. Even under these conditions, a large amount of heaving, pitching, and rolling motions caused by wave action made operations from the craft very difficult. The present invention fills the need for a float device which will permit the landing of a helicopter in a sea having five to eight foot waves and in heavy winds, these conditions for landing being far more severe than heretofore possible.

An object of the present invention is to provide a type of float which will enable a heavier-than-air aircraft to land vertically on water.

A further object is to provide a float which will minimize the effect of wave action on the heavier-than-air craft.

Another object of the invention is to increase the radius of action of an aircraft by reducing the high consumption of fuel during hovering.

Still another object is to provide a seaplane with superior sea-keeping qualities.

In the aeronautical field, several types of vertically maneuverable aircraft have been developed. These have become known as "convertiplanes," "autogiros" and "helicopters." The present invention is applicable to any of the types of vertically maneuverable aircraft.

Other objects and many of the attendant advantages of this invention will be readily appreciated as the same becomes better understood by reference to the following detailed description when considered in connection with the accompanying drawings wherein.

Figure 1:
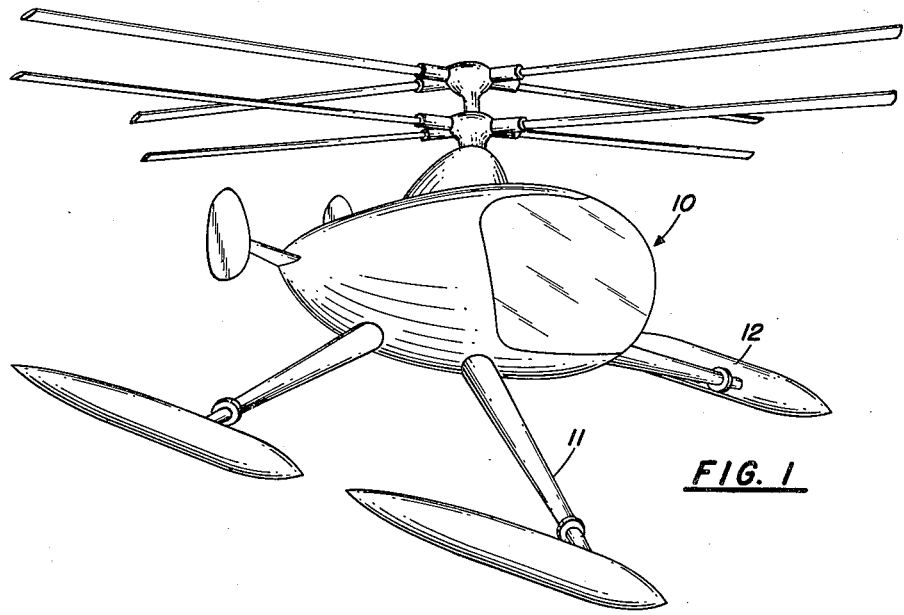
Fig. 1 is a perspective view of an amphibious helicopter with its floats in normal horizontal position.
Figure 2:
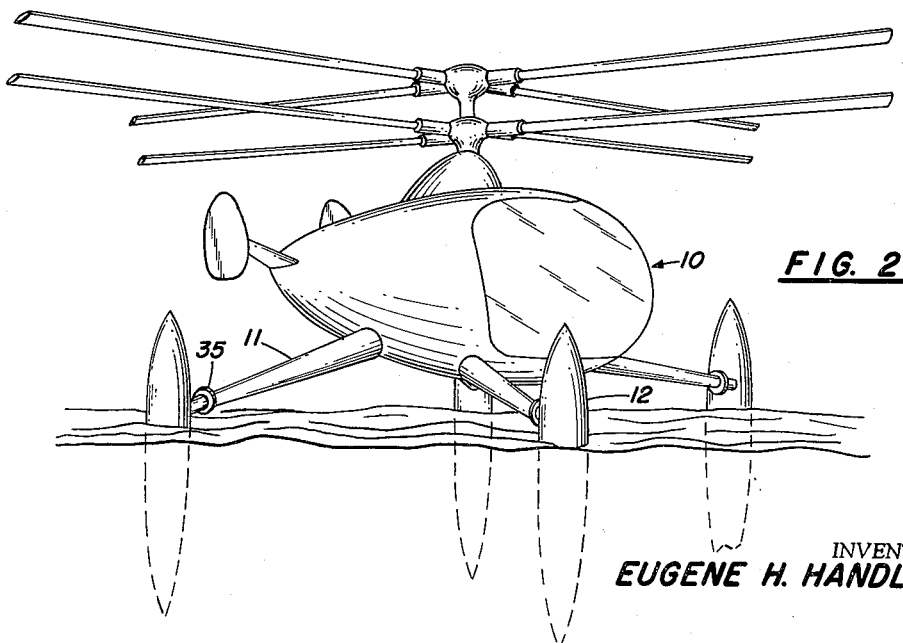
Fig. 2 is a view of a helicopter at rest in water with its floats in vertical position.
Figure 3:
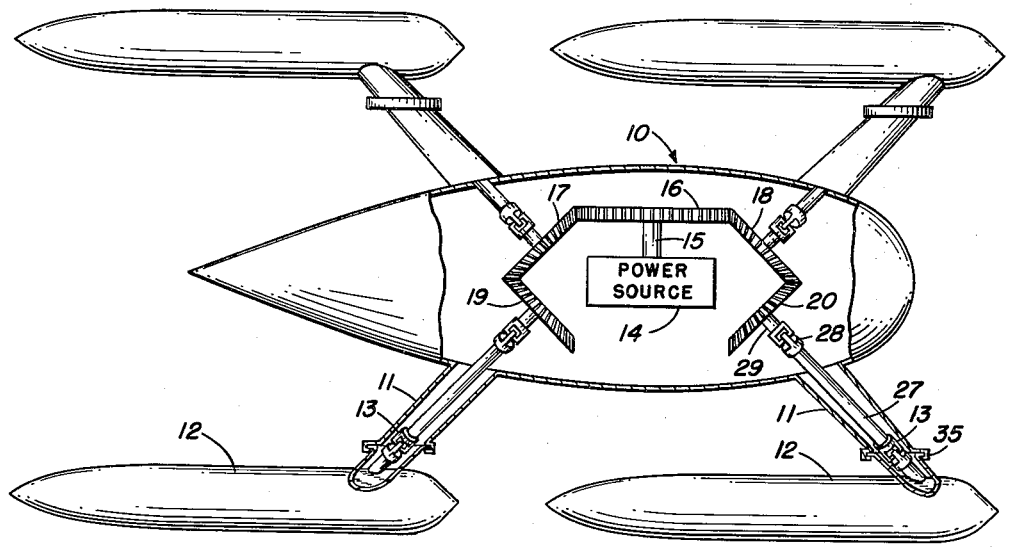
Fig. 3 is a top view of the helicopter with parts broken away illustrating one embodiment of the invention.
Figure 4:
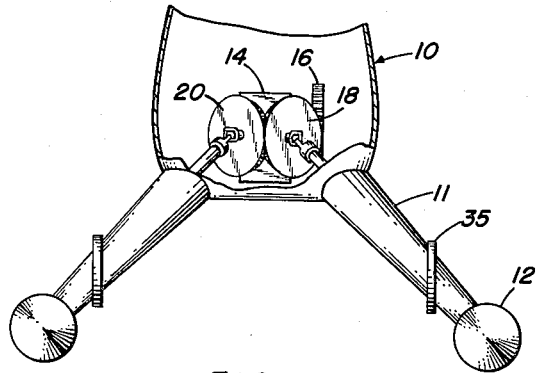
Fig. 4 is a front view with parts broken away further illustrating the gearing mechanism of the embodiment of Fig. 3.

Referring now to the drawings, wherein like reference characters designate like or corresponding parts throughout the several views, there is shown in Fig. 1 an aircraft of the vertical lift type designated generally at 10 having struts 11 and floats 12 pivotally connected thereto. As illustrated in Fig. 1, the helicopter normally carries the floats in a horizontal position when in flight, or at rest on land, a flight deck or in calm water. Since the vertical motion of a hull floating in a wave is a function of the value $$R = \frac{\text{change of displacement}}{\text{depth of immersion}}$$

a large value of R would force a shallow vessel to ride violently on top of the waves. If, however, a long, slender, vertical object floated, the vertical motion is significantly reduced. In order to decrease the effect of wave action on the helicopter 10, floats 12 are designed to pivotally rotate to a vertical position, as shown in Fig. 2, with said floats having a high length/diameter ratio so as to minimize the value R defined above. The pivotal motion of the floats is accomplished by the use of a universal joint 13 within each strut 11 adjacent each float 12, more clearly shown in Fig. 3. The floats 12 are rotated by a power source 14 within the aircraft 10 and controlled by the pilot. Connected by a shaft 15 to the power source is a first gear 16. The teeth of the first gear 16 intermesh with bevel gears 17, 18 on each side of the first gear. Bevel gears 17, 18 intermesh with bevel gears 19, 20 respectively and thus provide a turning mechanism for each of the floats 12. Within the strut 11 is a shaft 27 having a universal joint 13, 28 on each end thereof. The joint 28 adjacent the bevel gear has a connecting shaft 29 affixed thereto and thereby receives rotational motion from the gears. The strut 11 is comprised of two parts connected together by inturned flanges as designated at 35. The rotation of universal joint 13 thus permits the turning of the float 12 and the lower portion of the strut. It is thus seen that application of the power source rotates each of the bevel gears 17 through 20 by a gear 16. The bevel gears, in turn, rotate the shaft 27 and floats 12 thereby permitting the helicopter 10 to rest with its floats in vertical position in comparatively rough seas.

Figure 5:
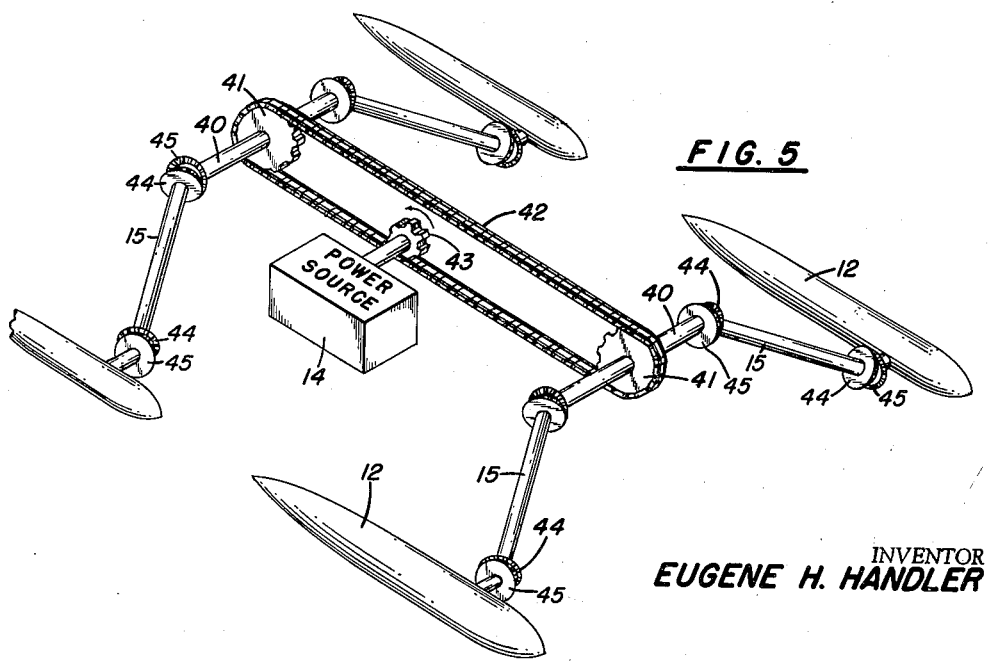
Fig. 5 is a schematic diagram illustrating a second embodiment of the invention.

Another means of rotating the floats 12 is shown in Fig. 5 of the drawings. Located centrally on the front and rear axles 40 of the helicopter 10 are gears 41. A closed sprocket chain 42 connects the gears 41 in operative relationship. A power source 14 imparts rotational movement to a gear 43 which, in turn, drives the sprocket chain 42. A pair of bevel gears 44 on each end of each shaft 15 engage with corresponding bevel gears 45 on the floats and axles 40 to cause the turning of the floats 12 into vertical or horizontal position by means of the driven chain 42 and axles 40. It is thereby seen that operation of power source 14 turns the sprocket chain 42 by means of gear 43. By meshing of gears 41 with chain 42, axles 40, shafts 15 and floats 12 are rotated to a vertical position for floating the aircraft in water.

Figure 6:
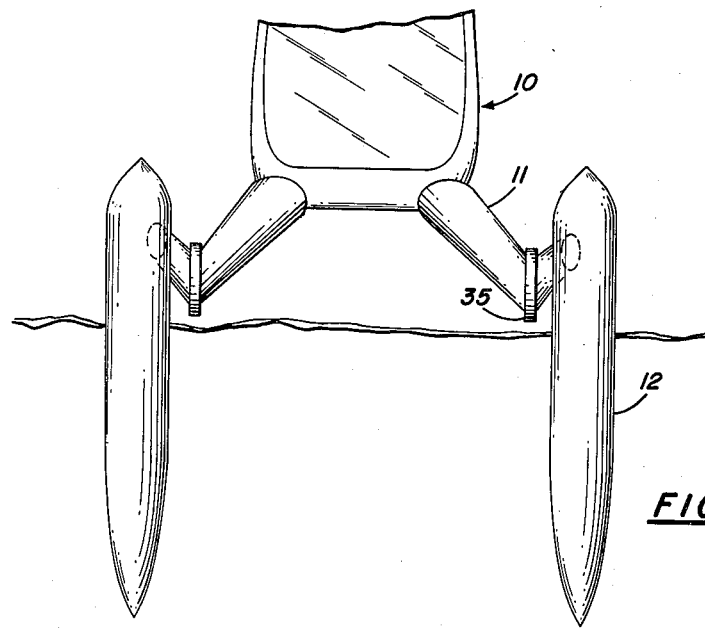
Fig. 6 is a side view showing a bottom portion of the helicopter floating on water and incorporating the features of Fig. 3.

The steadiness of a helicopter having vertical floats is not a result of stability but is instead a result of an insensitivity to external forces. As shown in Fig. 6 of the drawings, the floats 12 act on a principle similar to that of vertical buoys to sustain the aircraft in a relatively stable condition. However, should the aircraft heel or pitch to a large angle, the vertical floats will not give a substantial righting effect since their purpose is to merely give a steadying effect. Consequently, during open ocean operations or in particularly rough seas, the needed stability must be furnished by the rotors operating at one-fourth to one-third power.

Obviously many modifications and variations of the present invention are possible in the light of the above teachings. It is therefore to be understood that within the scope of the appended claims the invention may be practiced otherwise than as specifically described.

What is claimed is:

1. An aircraft of the vertically operable type comprised of a main body, rotors atop the main body to provide vertical lift and horizontal motion, a plurality of struts secured to said body, a float pivotally connected to each of said struts for use in a horizontal position to support the aircraft when at rest in calm water, and means for rotating said floats to a vertical position for supporting and steadying said aircraft when at rest in an open sea.

2. An aircraft of the vertically operable type comprised of a main body having a longitudinal axis, rotors atop the main body to provide vertical lift and horizontal motion, a plurality of struts secured to said body, and a float pivotally connected to each of said struts, each of said floats having a longitudinal axis and being adapted to support the aircraft on water, and means to rotate said floats to a first position whereby the longitudinal axis of each float is parallel to the longitudinal axis of said main body for use in minimizing air resistance in flight and for alighting in calm water and to rotate said floats to a second position wherein the longitudinal axis of each float is perpendicular to the longitudinal axis of said main body when at rest in an open sea.

3. An aircraft of the vertically operable type comprising a main body, rotors atop the main body to provide vertical lift and horizontal motion, struts extending outwardly from said main body, a rotatable shaft within each of said struts, a float for supporting the aircraft on water pivotally secured to each of said struts and each float having a lateral axis, each of said shafts being connected between a driving means and said float, and a power source to operate said driving means, whereby operation of said power source rotates each of said floats ninety degrees about its lateral axis.

4. An aircraft landing structure for supporting the aircraft on water and having a power source, a plurality of shafts and floats, each of said shafts pivotally connected at one end to a corresponding float, a gear connected to the other end of each of said shafts, certain of said gears being intermeshed and operable through said power source whereby said rotatable shafts are adapted to rotate said floats.

References Cited in the file of this patent

UNITED STATES PATENTS

| | | |
|---|---|---|
| 1,291,126 | Porter | Jan. 14, 1919 |
| 1,750,959 | Lake | Mar. 18, 1930 |
| 1,879,745 | Henker | Sept. 27, 1932 |
| 2,082,376 | Boettner | June 1, 1937 |
| 2,207,735 | Herb | July 16, 1940 |
| 2,347,959 | Moore et al. | May 2, 1944 |
| 2,412,793 | Weissman | Dec. 17, 1946 |